United States Patent
Harris et al.

(10) Patent No.: US 11,449,844 B1
(45) Date of Patent: Sep. 20, 2022

(54) MANAGEMENT OF PAYMENT PLAN DATA IN A DISTRIBUTED ENVIRONMENT

(71) Applicant: Coupa Software Incorporated, San Mateo, CA (US)

(72) Inventors: Scott Harris, Menlo Park, CA (US); Donna Wilczek, Sonoma, CA (US)

(73) Assignee: Coupa Software Incorporated, San Mateo, CA (US)

( * ) Notice: Subject to any disclaimer, the term of this patent is extended or adjusted under 35 U.S.C. 154(b) by 18 days.

(21) Appl. No.: 16/677,025

(22) Filed: Nov. 7, 2019

Related U.S. Application Data

(60) Provisional application No. 62/816,591, filed on Mar. 11, 2019.

(51) Int. Cl.
| | | |
|---|---|---|
| *G06Q 20/00* | (2012.01) | |
| *G06Q 20/10* | (2012.01) | |
| *G06Q 30/04* | (2012.01) | |
| *G06Q 20/40* | (2012.01) | |

(52) U.S. Cl.
CPC ......... *G06Q 20/102* (2013.01); *G06Q 20/403* (2013.01); *G06Q 30/04* (2013.01)

(58) Field of Classification Search
CPC .................................................. G06Q 20/102
USPC .................................................... 705/40, 35
See application file for complete search history.

(56) References Cited

U.S. PATENT DOCUMENTS

| | | | |
|---|---|---|---|
| 8,352,366 B1 | 1/2013 | Keld | |
| 8,527,405 B1* | 9/2013 | Das | G06Q 30/0215 |
| | | | 705/39 |
| 9,721,289 B2 | 8/2017 | Esekow | |
| 2002/0062249 A1* | 5/2002 | Iannacci | G06Q 20/105 |
| | | | 705/14.1 |
| 2003/0220863 A1* | 11/2003 | Holm | G06Q 20/387 |
| | | | 705/37 |
| 2004/0172360 A1 | 9/2004 | Mabrey | |
| 2005/0246240 A1* | 11/2005 | Padilla | G06Q 10/06 |
| | | | 705/26.3 |
| 2005/0283437 A1* | 12/2005 | McRae | G06Q 30/02 |
| | | | 705/40 |
| 2012/0109819 A1 | 5/2012 | Aidoo | |
| 2014/0344147 A1 | 11/2014 | Smith | |
| 2015/0379499 A1 | 12/2015 | Wang | |
| 2020/0265352 A1* | 8/2020 | Haimes | H04L 9/3239 |

OTHER PUBLICATIONS

IEEE Intelligent Systems (vol. 16, pp. 28-40; Issue: 4, Jul.-Aug. 2001), Matching buyers and suppliers: an intelligent dynamic exchange model ; Authors Sung Ho Ha and Sang Chan Park: (Year: 2001).*

(Continued)

*Primary Examiner* — Bruce I Ebersman
*Assistant Examiner* — John A Anderson
(74) *Attorney, Agent, or Firm* — Baker Botts L.L.P.

(57) ABSTRACT

This application discloses systems, methods, and computer products related to generation, analysis, and transmission of multiple types of data among multiple computers within a networked computer environment. The disclosed approaches further enable integration of different types of data, notification of availability of certain types of data, and coordination of communication of specific types of data.

19 Claims, 8 Drawing Sheets

(56) References Cited

OTHER PUBLICATIONS

Harris, U.S. Appl. No. 15/653,065, filed Jul. 18, 2017, Restriction Requirement, dated Sep. 13, 2017.
Harris, U.S. Appl. No. 15/653,065, filed Jul. 18, 2017, Office Action, dated Oct. 10, 2017.
Harris, U.S. Appl. No. 15/653,065, filed Jul. 18, 2017, Office Action, dated Jul. 13, 2018.
Harris, U.S. Appl. No. 15/653,065, filed Jul. 18, 2017, Interview Summary, dated Nov. 2, 2018.
Harris, U.S. Appl. No. 15/653,065, filed Jul. 18, 2017, Interview Summary, dated Jan. 4, 2018.
Harris, U.S. Appl. No. 15/653,065, filed Jul. 18, 2017, Final Office Action, dated May 4, 2018.
Harris, U.S. Appl. No. 15/653,065, filed Jul. 18, 2017, Examiners Answers, dated Aug. 28, 2019.
Harris, U.S. Appl. No. 15/653,065, filed Jul. 18, 2017, Final Office Action, dated Feb. 7, 2019.

* cited by examiner

FIG. 4

Coupa Accelerate Preferences

To get your invoices paid faster by offering an invoice discount, please set your preferences below. Your customers can, at their discretion, use Coupa Accelerate to automatically apply the preferred payment terms to any of your invoices. You can change your preferences at any time on this page. Email accelerate@coupa.com if you need any assistance.

Your original payment term — Your preferred accelerated payment term — 402

| Net 30 | 1%/10 NET 30 |
| Net 45 | None |
| Net 60 | 2.5%/10 NET 60 |
| Net 75 | None |
| Net 90 | None |
| Net 100 | None |

406

Person or Group at your company (typically finance or treasury) who has approved your preferred accelerated payment term

* Name: [Type Name]
* Email: [Type email address]

404

☑ Apply to ALL invoices, (including non-PO invoices and Coupa invoices not submitted through this Supplier Portal). Learn more

408

[Cancel] [Save]

MANAGEMENT OF PAYMENT PLAN DATA IN A DISTRIBUTED ENVIRONMENT

BENEFIT CLAIM

This application claims the benefit under 35 U.S.C. § 119(e) of provisional application 62/816,591, filed Mar. 11, 2019, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure generally relates to computer-implemented systems and digital processing, and specifically data propagation and coordination in a distributed environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Ecommerce transactions constitute an integral aspect of modern life. A large volume of digital data is transmitted, analyzed, modified, or otherwise processed across computer networks in ecommerce transactions. A major component of such digital data is monetary data, such as data related to pricing and payment. For example, when a buyer intends to purchase a product from a supplier, they generally agree on a price for the product and a payment due date. A more complex transaction may be associated with a more complex monetary aspect, and the buyer and the supplier may agree on a payment plan instead, where the price or amount owed varies or is discounted depending on when the payment is made. Such a payment plan may provide flexibility and expediency in transactional processing.

Various details of the payment plan are then to be communicated between the buyer's computing device and the supplier's computing device over one or more communication networks, possibly incorporated into different types of data exchanged between the devices. The various details can be expressed to various degrees, in various forms, or at various times. The complexity of communicating the various details can lead to prolonged data processing time, cumbersome user-system interaction, or other issues.

Therefore, it would be useful to have a solution that facilitates integration and propagation of ecommerce data, especially those related to pricing and payment, which in turn leads to streamlining of ecommerce processes and improvement of computing efficiency.

BRIEF DESCRIPTION OF THE DRAWINGS

FIG. 4 illustrates an example graphical user interface (GUI) for inputting accelerate preferences.

DETAILED DESCRIPTION

Figure 1:
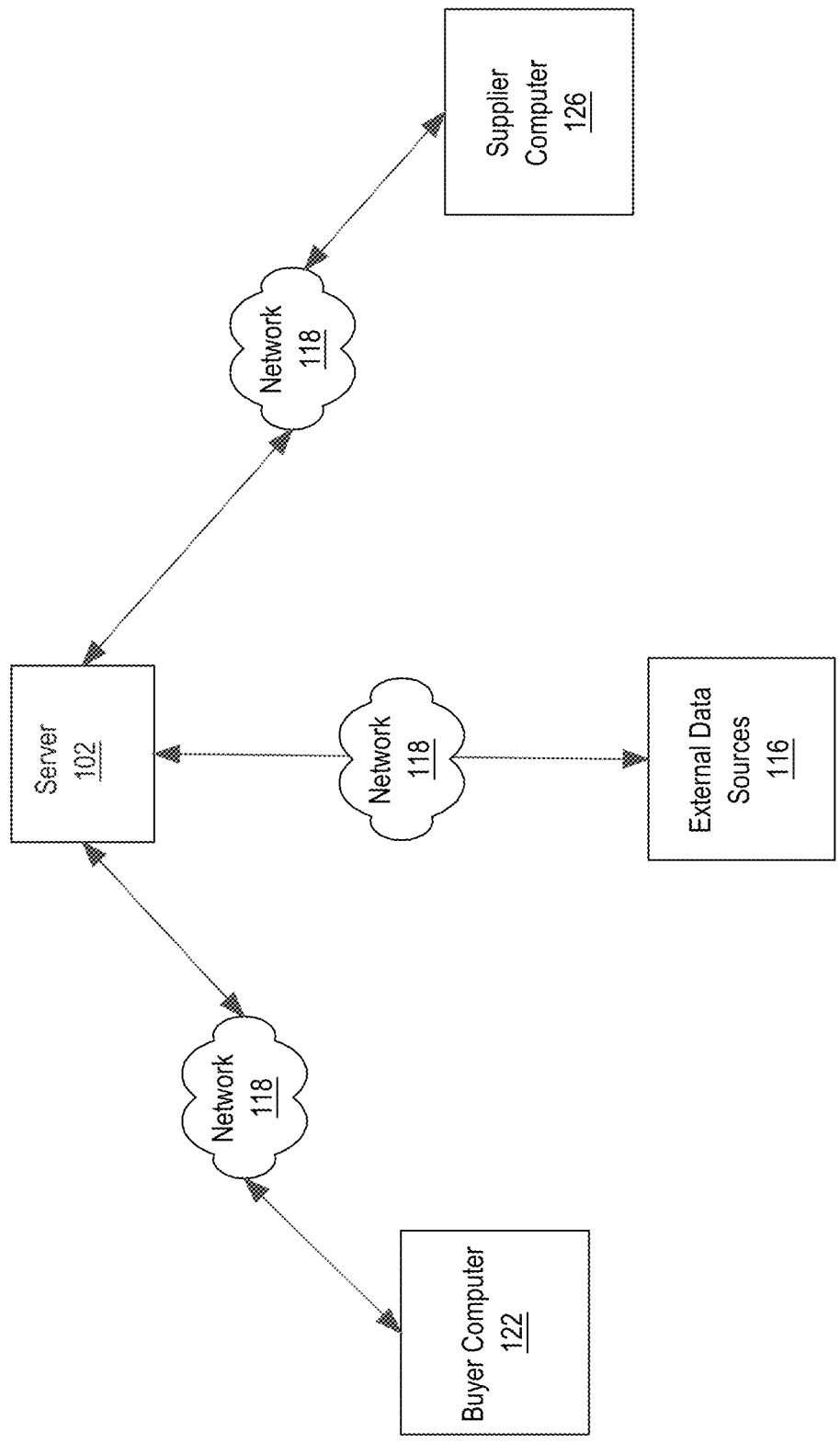
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Certain embodiments are described in the content of an application executing on a mobile computing device that works with a server computer. However, it is understood that an application is only executing code which may occur solely or partially on the mobile computing device. For example, the same principles as discussed in this application would be possible using a standalone computer, without access to a server computer.

Embodiments are described in sections according to the following outline:
  GENERAL OVERVIEW
  EXAMPLE COMPUTING ENVIRONMENT
  EXAMPLE SYSTEMS AND METHODS
    ACCOUNT MANAGEMENT
    PURCHASE REQUISITION PROCESSING
    PURCHASE ORDER PROCESSING
    INVOICE PROCESSING
    PAYMENT PROCESSING
    GENERAL ANALYSIS AND MANAGEMENT
    EXAMPLE SERVER PROCESS
  IMPLEMENTATION EXAMPLE—HARDWARE OVERVIEW General Overview This disclosure presents systems, methods, and computer products related to management of payment and pricing data. In some embodiments, disclosed approaches facilitate integration and propagation of monetary data, including payment plans indicating accelerate or delay preferences. For example, these approaches allow buyer and supplier computers to communicate respective payment plans or discount plans and metadata associated with these payment plans in terms of presentation, update, notification, and other aspects. The disclosed systems then automatically generate appropriate ecommerce data in light of the payment plans and the metadata, analyze such data, and/or effectively communicate such data.

The disclosed approaches help save time by allowing users to set up transactional preferences and metadata for the preferences once and automatically applying these preferences when appropriate based on the metadata. These approaches help reduce process overhead by effectively presenting the preferences and facilitating communication of responses to these preferences. Furthermore, these approaches help increase data accuracy by properly preparing and verifying transactional data with respect to the preferences and the metadata. In addition, these approaches help increase transactional throughput by aiding users in adjusting the preferences to result in larger orders and faster payments.

In some embodiments, a computer-implemented method of communicating payment plan data according to a specific schedule is disclosed. The method comprises receiving, by a processor, payment plan data from a supplier device, the payment plan data indicating a reward for an accelerated payment. The method also comprises receiving, by the processor, an instruction to transmit the payment plan data at a time associated with a purchase requisition, and further information of whether to transmit the payment plan data at a later time. The method further comprises receiving a request to approve a purchase from a buyer device, and generating or modifying a purchase requisition for purchasing an item associated with the supplier device in response to the request. In addition, the method comprises transmitting the purchase requisition with the payment plan data to the buyer device.

In some embodiments, a computer-implemented method of communicating payment plan data according to a specific schedule is disclosed. The method comprises causing, by a processor, display by a supplier device of a plurality of accelerated payment terms, each indicating a payment deadline, an accelerated payment date, and a discount amount. The method also comprises causing, by the processor, further display of a plurality of data types, including a purchase requisition, a purchase order, an invoice, a payment receipt, a payment confirmation message, or a payment acknowledgement message. Furthermore, the method comprises receiving a selection of one of the plurality of accelerated payment terms, and receiving a selection of one of the plurality of data types. The method additionally comprises transmitting the one accelerated payment terms with specific data related to the supplier device and having the one data type to the buyer device.

In some embodiments, a computer-implemented method of communicating payment plan data according to a specific schedule is disclosed. The method comprises receiving, by a processor, payment plan data from a supplier device, the payment plan data indicating a reward for an accelerated payment. The method also comprises receiving, by the processor, an instruction to transmit the payment plan data at a time associated with a purchase requisition. In addition, the method comprises receiving a request to approve a purchase from a buyer device, and generating or modifying a purchase requisition for purchasing an item associated with the supplier device in response to the request. Furthermore, the method comprises causing display by the buyer device of a graphical user interface having an option to continuously adjust a tentative payment date, and receiving one or more tentative payment dates from the buyer device. Finally, the method comprises causing, as the one or more tentative payment dates are received, display of the graphical user interface showing one or more corresponding payment amounts or discount amounts for the purchase requisition based on the payment plan data.

In some embodiments, a computer-implemented method of communicating payment plan data according to a specific schedule is disclosed. The method comprises receiving, by a processor, payment plan data from a supplier device, the payment plan data indicating a reward for an accelerated payment, and receiving, by the processor, an instruction to transmit the payment plan data at a time associated with a purchase requisition. The method also comprises receiving a request to approve a purchase from a buyer device, and generating or modifying a purchase requisition for purchasing an item associated with the supplier device in response to the request. Furthermore, the method comprises transmitting the purchase requisition with the payment plan data to the buyer device. The method additionally comprises receiving from the buyer device a payment confirmation message, and extracting a payment amount from the payment confirmation message. Finally, the method comprises verifying the payment amount against the payment plan data, and transmitting a result of the verifying to the supplier device.

Example Computing Environment

FIG. 1 illustrates an example networked computer system in which various embodiments may be practiced. FIG. 1 is shown in simplified, schematic format for purposes of illustrating a clear example and other embodiments may include additional or different elements.

In one embodiment, a computer system 100 comprises a server 102, one or more buyer computers 122, one or more supplier computers 126, and one or more external data sources 116, which are communicatively coupled directly or indirectly via one or more networks 118. The server 102 broadly represents one or more computers, virtual computing instances, and/or instances of a server-based application that is programmed to host or execute functions of an e-procurement system including but not limited to maintaining supplier data, managing purchase requisitions, purchase orders, invoicing, notifications and alerts, e-mail messaging and other functions. The server 102 can comprise a server farm, a cloud computing platform, a parallel computer, or any other computing facility with sufficient computing power in data processing, data storage, and network communication for managing ecommerce transactions between the buyer computers and the supplier computers across the communication networks. The server 102 manages ecommerce transactions between the buyer computers 122 and supplier computers 126, where the different computing devices can reside in the same or different domains.

Each buyer computer 122 broadly represents one or more computers, virtual computing instances, and/or instances of an e-procurement application program that are associated with an institution or entity that is related as a buyer with respect to a separate entity associated with the supplier computer 126. The buyer computer 122 may comprise a desktop computer, laptop computer, tablet computer, smartphone, wearable device, or any other type of computing device that is capable of proper communication with the server as well as adequate local data processing and storage. In some cases, buyer computer 122 may be a personal computer or workstation that hosts or executes a browser and communicates via HTTP and HTML over the network 118 with a server-side e-procurement application hosted or executed at server 102. In other cases, buyer computer 122 may be a server-class computer and/or virtual computing instance that hosts or executes an instance of an e-procurement application that communicates programmatically via API calls, RPC or other programmatic messaging with server 102.

Similarly, each supplier computer 126 broadly represents one or more computers, virtual computing instances, and/or instances of an e-procurement application program that are associated with an institution or entity that is related as a supplier with respect to a separate entity associated with the buyer computer 122. The supplier computer 126 may comprise a desktop computer, laptop computer, tablet computer, smartphone, wearable device, or any other type of computing device that is capable of proper communication with the server as well as adequate local data processing and storage. In some cases, supplier computer 126 may be a personal computer or workstation that hosts or executes a browser and communicates via HTTP and HTML over network 118 with a server-side e-procurement application hosted or executed at server 102. In other cases, supplier computer 126 may be a server-class computer and/or virtual computing instance that hosts or executes an instance of an e-procurement application that communicates programmatically via API calls, RPC or other programmatic messaging with server 102.

External data sources 116 represents one or more computers that store or manage, and can deliver in response to programmatic calls or messages, data related to products, suppliers, or buyers. The term "external" merely means that data stored using the external data sources 116 is not directly owned, operated or managed by server 102 or an entity associated with that server.

Network 118 broadly represents any combination of one or more local area networks, wide area networks or internetworks using any of wired, wireless, terrestrial or satellite links. The public internet may be used as one element of networks 118.

Figure 2:
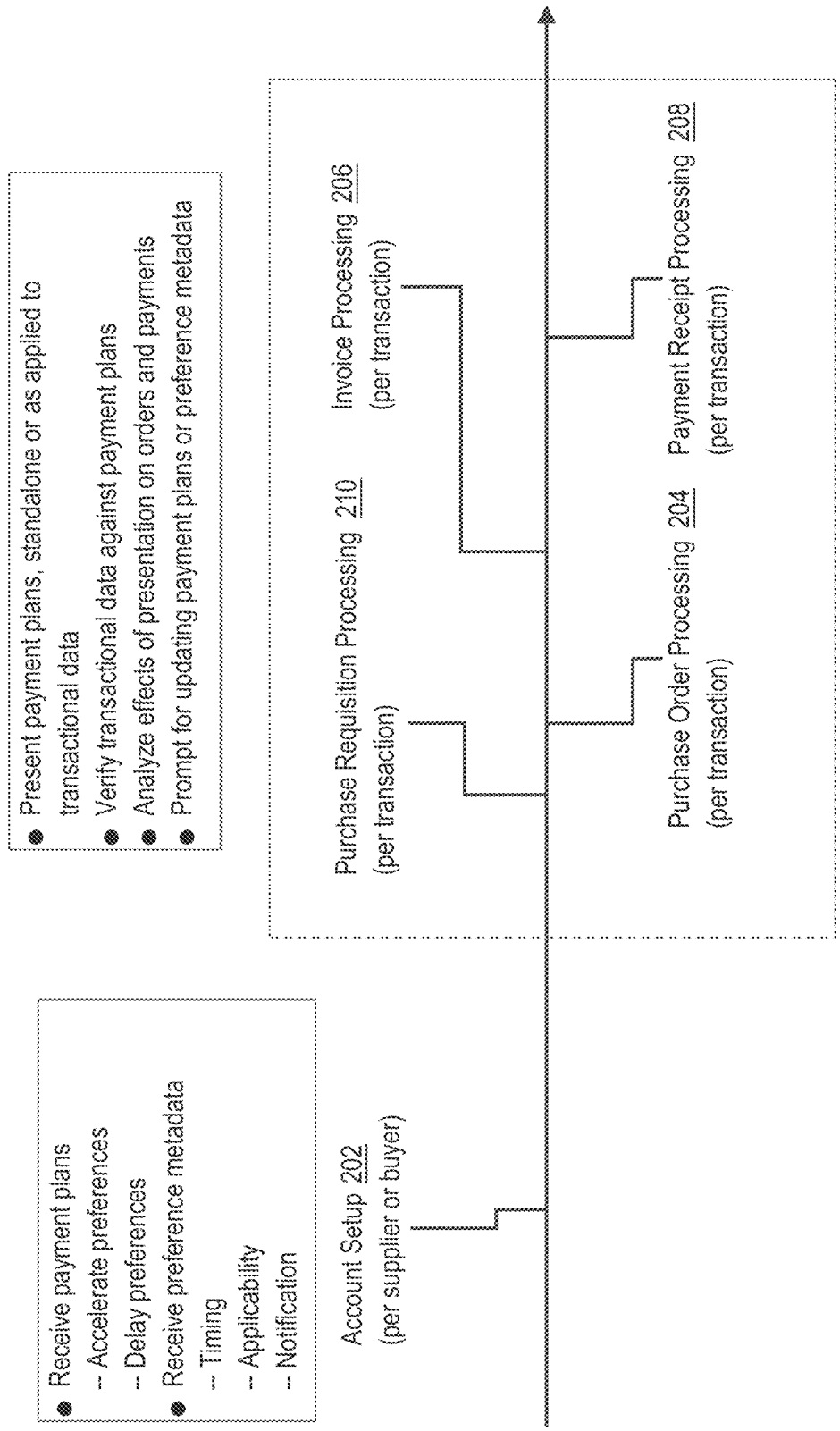
FIG. 2 illustrates an example workflow through an ecommerce transaction.

FIG. 2 illustrates an example workflow through an ecommerce transaction. FIG. 2, and each other flow diagram herein, is intended to disclose an algorithm, plan or outline that can be used to implement one or more computer programs or other software elements which when executed cause performing the functional improvements and technical advances that are described herein. Furthermore, FIG. 2 and each other flow diagram herein is described at the same level of detail that persons of ordinary skill in the art ordinarily use to communicate with one another about algorithms, plans, or specifications forming a basis of software programs that they plan to code or implement using their accumulated skill and knowledge.

In some embodiments, initially, a buyer computer 122 or a supplier computer 126 registers with the server 102, indicating specific requirements and preferences. In account setup operation 202, the server 102 then creates an account and a profile for the computer 122, 126 and stores account data and/or profile data in a database coupled to or accessible by the server 102.

The profile may include one or more payment plans, or the payment plans can be provided to the server 102 at a later time. "Payment plan," in this context, may refer to a digitally stored table of data specifying one or more sets of discounts, dates for payment with discount, and dates for undiscounted payment, with respect to invoices or other procurement documents that are communicated from the supplier computer 126 to the buyer computer 122 through the server 102. The payment plans can include accelerate preferences that determine how to reward early payments with discounts or delay preferences that determine how to penalize late payments with interests. The payment plans can also include or be supplemented with preference metadata related to the applicability, presentation, notification, and other aspects. For example, the preference metadata can relate to a definition or classification of the reward or penalty mechanism, creation or modification of such a mechanism, applicability of such a mechanism, presentation of such a mechanism, notifications of enforcing such a mechanism, and so on. Typically, the supplier computer 126 creates and stores the payment plans at the database managed by server 102, using programmatic functions provided by the server, to indicate the reward a supplier is offering or the penalty the supplier will enforce. However, in an embodiment, the buyer computer 122 can also provide the payment plans to indicate the reward a buyer is requesting to receive and the penalty the buyer is willing to accept. When both the supplier computer 126 and the buyer computer 122 have provided payment plans that conflict, the server 102 is programmed to reconcile them, for example, by selecting a payment plan record that has longer or more conservative terms.

In some embodiments, in response to receiving the payment plan data from one of the buyer computer 122 or the supplier computer 126, the server 102 presents some or all of the payment plan data to the opposite computer. The presentation can be made at specific time points according to the preference metadata, including before or during an ecommerce transaction, such as when key data is generated during the ecommerce transaction. Such key data can be a supplier record, a purchase requisition, a purchase order, an invoice, or a payment receipt.

In one embodiment, the buyer computer 122 initiates an ecommerce transaction with the supplier computer 126, and submit a purchase request to the server 102 or a request to approve a purchase. In purchase requisition processing operation 210, the server 102 generates a purchase requisition including or along with portions of the payment plan data in response to the purchase request based on the preference metadata. The server 102 transmits the generated data to another buyer computer 122. In response to the purchase requisition, a buyer computer 122 submits a request to order an item. Each of the foregoing steps or operations may comprise an electronic digital message or programmatic call that is transmitted between the computers 122, 126 and server 102 via the network 118.

In purchase order processing operation 204, the server 102 generates a purchase order including or along with portions of the payment plan data in response to the request to order the item based on the preference metadata. The server 102 transmits the generated data to the supplier computer 126 or the buyer computer 122. In response to the purchase order, the supplier computer 126 submits an approval of at least part of the purchase order to the server 102.

In invoice processing operation 206, the server 102 generates an invoice including or along with portions of the payment plan data in response to the approval based on the preference metadata. The server 102 transmits the invoice data to the buyer computer 122. In response to the invoice data, the buyer computer 122 submits a payment confirmation message to the server 102. In an embodiment, actual payment processing and movement of funds is performed outside the system of FIG. 1 or FIG. 2 and server 102 merely serves as a repository of records about external payments.

In payment processing operation 208, server 102 generates a payment acknowledgment message referencing, including or along with portions of the payment plan data, in response to the payment confirmation message and based on the preference metadata. The server 102 transmits the payment acknowledgment message to the supplier computer 126.

During each of the processing stages 210, 204, 206, and 208 or between them, the server 102 can also be programmed to verify transactional data against the payment plan data. For example, the server 102 can be programmed to verify whether an approval or a purchase order from a supplier computer 126 or a payment from a buyer computer 122 properly reflects a reward or a penalty in the payment plan data. The server 102 can also be programmed to analyze how presenting the payment plan data at specific time points affects the orders and payments. For example, the server 102 may be programmed to determine that an early access to the payment plan data by the buyer computer 122 often leads to a larger order. Based on such analysis or the preference metadata, the server 102 can be programmed to send a request to the supplier computer 126 or the buyer computer 122 to update the payment plan data or the preference metadata.

In this manner, the server 102 improves efficiency of ecommerce transactions by permitting a supplier computer 126 to create and store, and thereby advertise, the payment plan data to buyer computers 122, rather than using e-mail messages or other communications separate from the server 102 to communicate equivalent data. Instead, early payment discount plans, embodied in the payment plan data, are integrated into an ecommerce system such as an e-procurement system where the payment plan data is immediately available to buyer computers 122 that are reviewing or approving invoices. The result is to streamline dataflow and reduce transactional delay, as well as reduce the use of network bandwidth, data storage and memory use which would inevitably result from processing larger number of messages.

Example Systems and Methods

Figure 3:
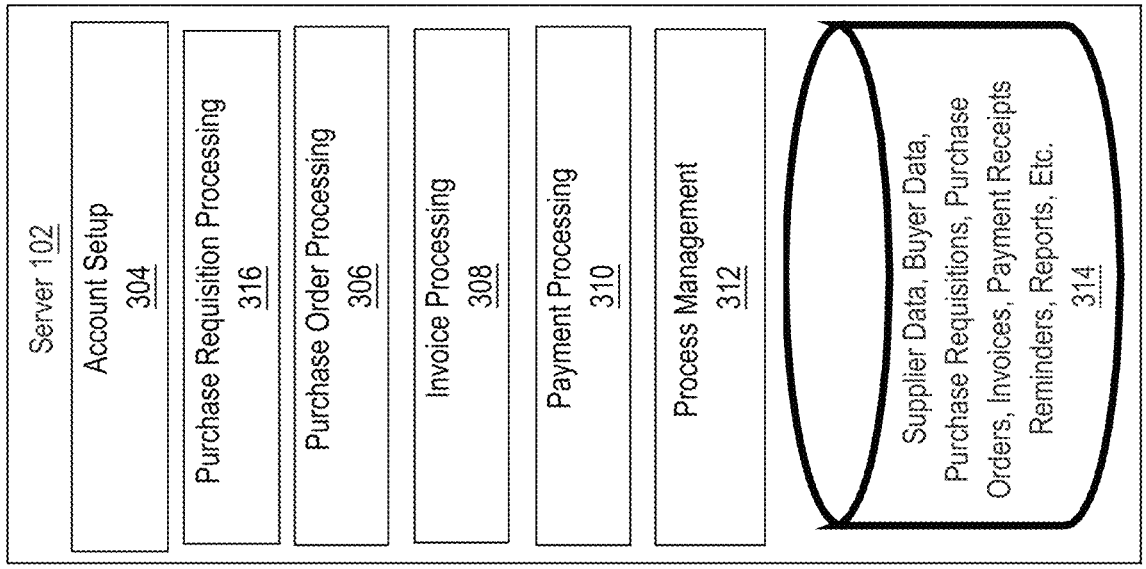
FIG. 3 illustrates an example server organization.

FIG. 3 illustrates an example server organization that may be used in an embodiment. In some embodiments, the server 102 (FIG. 1) comprises an account setup component 304, a purchase requisition processing component 316, a purchase order processing component 306, an invoice processing component 308, a payment processing component 310, and a process management component 312. Each of the components 304, 316, 306, 308, 310, 312 may be implemented using one or more stored computer programs, other software elements, firmware or a combination thereof. The server 102 also comprises one or more databases 314, which may be implemented using any of relational databases, object databases, flat file systems or JSON stores. The one or more databases 314 can be connected to the components 304, 316, 306, 308, 310, or 312 locally or through the networks 118 (FIG. 1) using programmatic calls, remote procedure call (RPC) facilities or a messaging bus. FIG. 3 is shown in simplified format to clearly and the server 102 can comprise fewer or more functional or storage components. The same organization can also apply to a supplier computer or a buyer computer.

The account setup component 304 is programmed or configured for creating, updating, or deleting an account with the server 102 corresponding to a supplier computer 126 or a buyer computer 122. The purchase requisition processing component 316 is programmed or configured for creating, updating or transmitting a digital purchase requisition record corresponding to the request for approving a purchase of a product or service. The purchase order processing component 306 is programmed or configured for creating, updating or transmitting a digital purchase order record corresponding to the ordering or purchase of a product or service. The invoice processing component 308 is programmed or configured for creating, updating or transmitting a digital invoice record corresponding to the purchase of a product or service. The payment processing component 310 is programmed or configured for receiving, storing and transmitting digital confirmation and acknowledgment messages relating to a payment corresponding to the purchase of a product or service that was processed via an outside system. The processing management component 312 is programmed or configured for managing the other components 304, 306, 308, 310 and other functions described herein. The one or more databases 314 digitally store data related to supplier accounts, buyer accounts, supplier computers 126, buyer computers 122, ecommerce transactions, digital invoices, purchase requisitions, and purchase orders, and early payment discount data or other payment plan data.

Account Management

In an embodiment, the server 102 is programmed or configured to allow a supplier computer 122 to create an account with the server. The supplier computer 122 can invoke programmatic functions of server 102 to set up a profile linked to various requirements and preferences for ecommerce transactions. In one embodiment, the profile can be programmatically linked to one or more early payment discount plan records that specify accelerate or delay preferences and corresponding discounts that vary depending on payment dates.

The server 102 can be programmed or configured to provide a template for creating a payment plan record or specifying the preferences. Typically, a supplier computer 126 accesses the template to create and store one or more records each specifying a different combination of invoice payment terms, early payment discount amounts and early payment discount due dates.

FIG. 4 illustrates an example graphical user interface (GUI) for inputting accelerate preferences as part of an early payment discount data record. The accelerate preferences can be expressed in Net N in the format "p %/d1 NET d2", which means that an accelerated payment made within d1 days confers a discount of p % and a full payment or balance payment is due within d2 days. In an embodiment, the server 102 can be programmed or configured to cause display of a fixed number of options for the original (or full) payment term 406, such as Net 30 or Net 60. For each of these options for the original payment term, the server 102 can be programmed or configured to cause display of a fixed number of options for accelerated payment terms 402. For example, for Net 30, the server 102 may be programmed to display a GUI drop-down widget with selectable options denoted "0.75%/20 NET 30", "1%/10 NET 30" (currently shown), "1.25%/6 NET 30", and others in similar formats. The supplier computer 126 provides input specifying a choice of one or more of the given options. The GUI can also accept information of a party 404 authorized to enter or approve the choices, for audit, security, or other purposes. Furthermore, the GUI can allow a specification of what types of documents to which the accelerate preferences should apply. For example, the option 408 when checked indicates a request to apply the accelerate preferences to all invoices processed by the server 102, regardless of which such an invoice is was generated or received by the server 102 and which such an invoice was generated from a purchase order or directly without a purchase order.

In some embodiments, the server 102 is programmed or configured with data structures and/or database records that are arranged to offer other options subject to specific constraints. Specifically, a supplier computer 126 may receive or be programmed to specify one or more formulae that relate the original payment term to the accelerated payment term and/or corresponding discount. For example, the supplier can specify that d2 is up to 60, d1 is also up to 60 or up to half of d2, and p equals 10/d2 or is fixed, where d2 is a positive number, or d2 is one of a set of positive integers.

In some embodiments, early payment discount data or accelerate preferences can be expressed and digitally stored in other forms. As one example, the server 102 may be configured or programmed with data structures and/or database records that are arranged to allow specifying a discount in terms of the number of periodic payments to be made, such as a 1% discount for making 6 monthly payments within 6 months, a 3% discount for making 3 monthly payments within 3 months, or a 2% discount for making 3 bi-monthly payments within 6 months. As another example, a discount can be specified in terms of the method of payment, such as 1% by check and 2% by cash.

In some embodiments, the server 102 is programmed or configured to allow a supplier computer 126 to indicate when to present one or more portions of the payment plan data to a buyer computer 122. The server 102 can be programmed to offer a fixed number of options corresponding to different events that occur in an ecommerce transaction, or different types of documents created in an ecommerce transaction. Examples include when a "payment plan" is modified, when a "buyer profile" is created, when an inquiry for "supplier data" is processed, when a "purchase requisition" for a product or service is created, when a "purchase order" for a product or service is placed, when billing for an order is performed and an "invoice" is issued, when a payment for an order is made and a "payment confirmation message" is transmitted, or when an acquisition "report" is generated. The server 102 can be further programmed to allow selection of a combination of these options or an incremental presentation. For example, selection of a specific timepoint can mean presentation of the payment plan data at that and each of the predetermined timepoints that are later in time. The server 102 can also be programmed to allow a supplier computer to provide a customized schedule for sending all or part of the payment plan data to a buyer computer, such as periodically or when an inquiry related a specific product type is made. The server 102 can be programmed to present information regarding the payment plan data as applied to default amounts or actual amounts in ecommerce transactions and incorporate estimated or actual payment amounts into appropriate transactional data.

In some embodiments, the server 102 can be programmed to allow payment plan data to include additional information, such as delay preferences. For example, a supplier computer 126 can specify a penalty for late payments (beyond the original payment term) at an annual percentage rate (APR), which is a fixed percentage value or a value that becomes larger over time according to a formula.

In some embodiments, the supplier computer 126 can be programmed to designate data representing a default payment plan and additional customized payment plans for different products, product categories, buyers, industries, geographies, or time periods. For example, data representing special payment plans can be designed for frequent buyers, consumer-oriented industries, high-priced products, European countries, or winter months. The supplier computer 126 can also be programmed to provide order-specific payment plans or individual preferences or requirements, such as a deeper discount for larger quantities or consecutive orders. Such flexible assignment of payment plans can apply to any type of documents created in an ecommerce transaction, as discussed in the previous paragraph.

In some embodiments, the server 102 can permit payment plan data, preference metadata, or the profile to be modified automatically or by instruction over time. The supplier computer 126 can update a payment plan anytime throughout the lifetime of a supplier account, such as creating, updating, or deleting any of the accelerate preferences. The supplier computer 126 can also be programmed to indicate, in the supplier profile, how one or more portions of the payment plan data are to be updated automatically based on internal or external historical data. For example, the supplier computer 126 can be programmed to specify that for certain new products the discount rates are to decrease gradually during a promotional period, for certain product categories the discount rates are to vary on a daily basis based on certain industrial indices, or the accelerate preferences are to be adjusted favorably for specific buyers who consistently transmit an invoice payment within a specific number of days.

In some embodiments, the server 102 is programmed to receive input from a supplier computer 126 to select the amount and manner of participation by a buyer computer 122 in determining payment plans. The supplier computer 126 can provide input to indicate whether a buyer computer 122 is permitted to negotiate accelerate or delay preferences, which buyer computer or buyer computer group is allowed to do so, and for which product or product categories. The server 102 may be programmed to receive input from the supplier computer 126 specifying to what extent the accelerate preferences or delay preferences apply, for example, up to a certain number of iterations. The server 102 may be programmed to receive input from the supplier computer 126 specifying at which points the accelerate or delay preferences apply, for example, before or after placing an order or receiving an invoice. The server 102 may be programmed to regulate interaction between the supplier computer 126 and the buyer computers 122 based upon rule data that is created and stored based on any of the foregoing input parameters from the supplier computer 126.

In some embodiments, the server 102 can be programmed to receive from a supplier computer 126 one or more preferences for additional aspects related to ecommerce transactions. Such aspects can include whether and when to receive notification of a buyer action or a copy relevant data, such as creating an account, requesting a payment plan, reviewing a payment plan, placing an order, or making a payment. Such aspects can also include whether and when to receive reminders of specific events, such as creating or updating payment plans, generating reports of offered discounts, or receiving order payments.

In some embodiments, the server 102 can be programmed to allow a buyer computer 122 to create an account with the server 102. The buyer computer 122 can be programmed to set up a profile linked to various requirements and preferences for engaging in ecommerce transactions. Specifically, the profile can be linked to one or more sets of payment plan data having accelerate or delay preferences that specify how prices vary depending on payment dates. The server 102 can be programmed to offer a template for formulating a payment plan or specifying accelerate preferences.

While it is generally a supplier computer 126 that manages payment plan data, the discussion above regarding account management is applicable with reversed roles for a supplier computer 126 and a buyer computer 122. However, while generally a supplier would prefer a smaller discount for accelerated payment and a larger penalty for late payment, a buyer would prefer the opposite. The buyer computer 122 may be programmed to retrieve, at the time of creating a purchase requisition or a purchase order, a list of available payment plan data and to select a particular set of payment plan data as proposed payment terms applicable to the purchase order, to transmit to the supplier computer 126 for review and acceptance. The supplier computer 126 may reply with an invoice to which confirming payment plan data is attached or referenced. A buyer computer 122 can request from the server 102 payment plan data sets associated with a supplier computer 126 for comparison shopping or other purposes, while a supplier computer can request the server 102 to distribute payment plans to buyer computers for marketing or other purposes. In addition, when both a supplier computer 126 and a buyer computer 122 have provided payment plan data or preference metadata, the server 102 can reconcile the data from both sources.

Purchase Requisition Processing

In some embodiments, a buyer computer 122 is programmed or configured with data structures and/or database records that are arranged to send a request to the server 102 to submit a request approve a purchase. The request may specify a type of product or service or a supplier. In response to the request, the server 102 is programmed or configured to generate a purchase requisition, typically showing information identifying the product or service, a desired quantity as appropriate, and an estimated price. In addition, the server 102 is programmed or configured to determine whether any payment plan data is applicable and whether the generation of a purchase requisition is associated with an opportunity to present the payment plan data. In response to a positive determination, the server 102 is programmed or configured to incorporate relevant information from the payment plan data into the purchase requisition or make such relevant information available along with the purchase requisition. The relevant information can be displayed as static information or the server 102 can be programmed or configured to allow a user or a user device to determine an optimal reward or penalty amount and a corresponding payment due date. The server 102 is also programmed or configured to review the request from the buyer computer 122 against the payment plan data and send appropriate notifications or recommendations to the buyer computer 122. For example, when the order quantity does not qualify for a discount, the server 102 can deliver a message to suggest an increased quantity.

Figure 5:
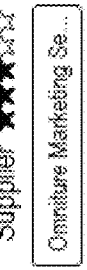
FIG. 5 illustrates an example purchase requisition that incorporates payment plan data or is combined with the payment plan data into one document.

FIG. 5 illustrates an example purchase requisition that incorporates payment plan data or is combined with the payment plan data into one document. The purchase requisition 500 has a first section 502 that indicates the type of request or type of item to purchase provided by the requester. In this example, the request is for a marketing service of advertising. The purchase requisition 500 has a second section 504 that indicates a description of the requested item provided by the requester, such as advertising "for new image editing software". The purchase requisition 500 has a third section 506 that indicates information regarding the supplier of the requested item provided by the requester or automatically determined by the server 102 based on the information in the first two sections 502, 504, such as "Omniture Marketing Services". The purchase requisition 500 has a fourth section 508 that indicates pricing information regarding the requested item provided by the requester or automatically determined by the server 102 based on the information in the first three sections 502, 504, 506. In this example, the pricing information is $800 for each unit of measure. The purchase requisition 500 has a fifth section 510 that indicates packaging and delivery information regarding the requested item provided by the requester or determined by the server 102 based on the information in the first three sections 502, 504, 506, such as FedEx for printed material. In addition, the purchase requisition 500 automatically includes relevant information from appropriate payment plan data 512 and corresponding discounted amount 514 based on the information in the first fourth section 502, 504, 506, 508. In this case, the payment plan data is shown as static information.

Figure 6:
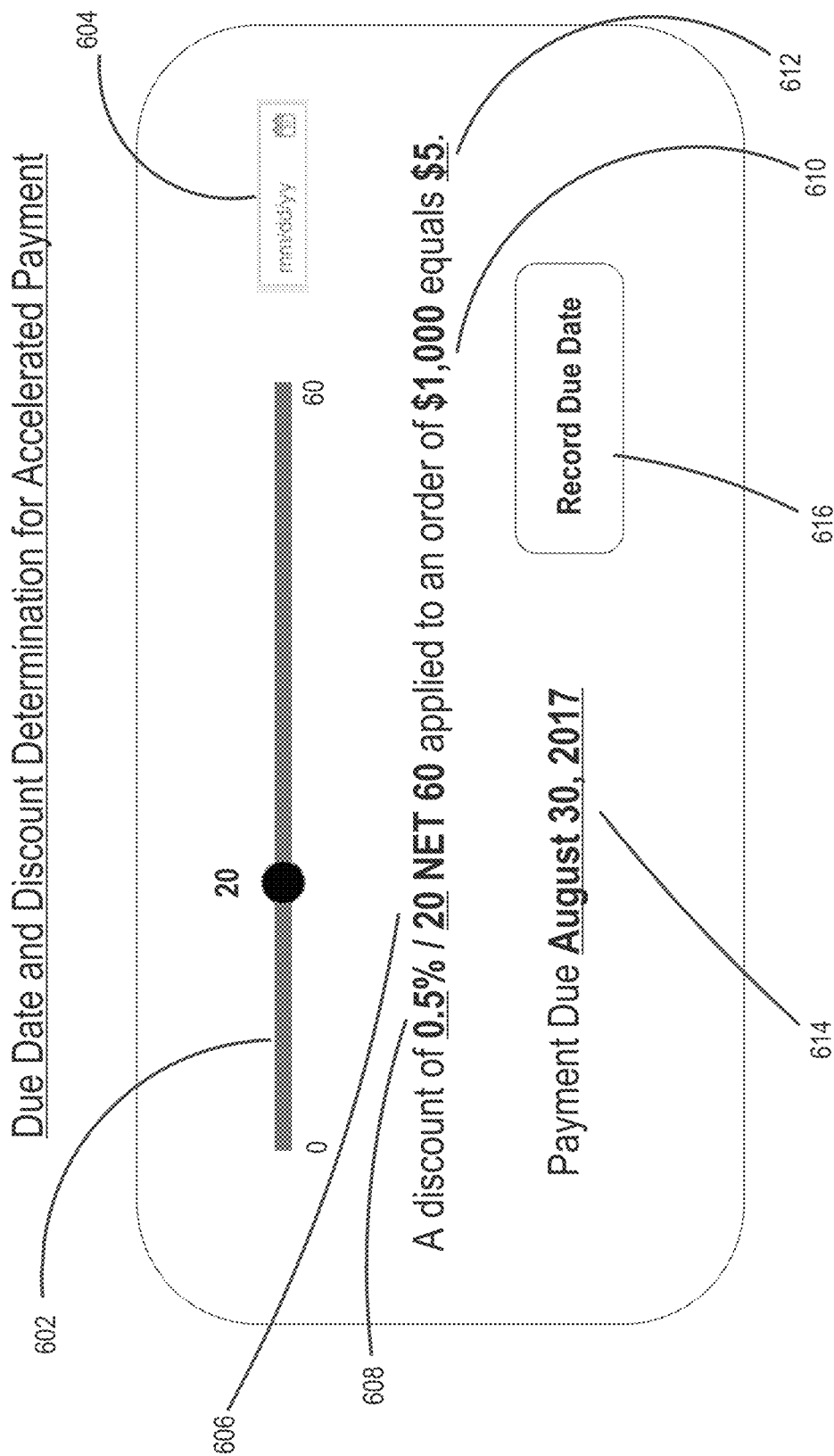
FIG. 6 illustrates an example GUI for reviewing accelerate preferences and effects of enforcing the accelerate preferences.

As noted above, instead of a static display, the server 102 can be programmed or configured to allow a user or a user device to determine an optimal reward or penalty amount and a corresponding payment due date when the payment plan data offers such flexibility. FIG. 6 illustrates an example GUI for reviewing accelerate preferences and effects of enforcing the accelerate preferences. As discussed above, the accelerate preferences can be expressed in Net N, namely "p %/d1 NET d2". In this example, d2 equals 60, d1 is up to 60, and p is related to d1. The server 102 can be programmed or configured to receive via the GUI a selection of a tentative payment date and determine how much discount can be applied for a given order based on the given early payment discount data or accelerate preference. The server 102 can be configured to cause display of a given order amount in the summary 610. The sliding bar 602 can be used to specify a value for d1, which is then reflected in the summary 606. The server 102 can also be programmed to take that value as the number of days from today to a corresponding due date and report that corresponding due date in the summary 614. In addition, the calendar feature 604 can be chosen to specify a due date, which is then reflected in the summary 614. The specified due date also sets the value for d1, which is then reflected in the sliding bar 602 and the summary 606. In response to a specified value for d1, the server 102 is further programmed or configured to cause display of the corresponding value for p in the summary 608 based on the predetermined relationship and the corresponding discount value in the summary 612 for the given order amount. Finally, hitting the button 616 can trigger the recording or propagation of the payment due date to be met in the rest of the ecommerce transaction.

In some embodiments, the server 102 is programmed or configured with data structures and/or database records that are arranged to automatically update payment plan data or preference metadata based on the purchase requisition now as historical data. Furthermore, the server 102 can be programmed or configured to send the generated purchase requisition or a notification thereof to an appropriate buyer computer 122, which can be different from the source of the request. In response to the purchase requisition, the buyer computer 122 can be programmed to transmit to the server 102 an approval, a rejection, or a set of necessary changes to the purchase requisition based on budget, supplier data, or other considerations. The buyer computer 122 can be programmed or configured to also transmit to the server 102 updated payment plan data or a request to update these payment plan data based on the purchase requisition.

Purchase Order Processing

In some embodiments, a buyer computer 122 is programmed or configured with data structures and/or database records that are arranged to send a request to the server 102 to place an order of a product or service by a supplier. In response to the request, the server 102 is programmed or configured to generate a purchase order, typically showing information identifying the product or service, a desired quantity as appropriate, and an estimated price. In addition, the server 102 is programmed or configured to determine whether any payment plan data is applicable and whether the generation of a purchase order is associated with an opportunity to present the payment plan data. In response to a positive answer, the server 102 is programmed or configured to incorporate relevant information from the payment plan data into the purchase order or make such relevant information available along with the purchase order. The relevant information could have been presented as discussed above in connection with a purchase requisition. In certain embodiments, when the payment plan data was presented or incorporated into a type of document that has led to the purchase order, such as a corresponding purchase requisition, the payment plan data is automatically presented or incorporated into the purchase order by default. The relevant information can similarly be displayed as static information or the server 102 can be programmed or configured to allow a user or a user device to determine an optimal reward or penalty amount and a corresponding payment due date. The server 102 is also programmed or configured to review the request from the buyer computer 122 against the payment plan data and send appropriate notifications or recommendations to the buyer computer 122. For example, when the order quantity does not qualify for a discount, the server 102 can deliver a message to suggest an increased quantity.

In some embodiments, the server 102 is programmed or configured with data structures and/or database records that are arranged to automatically update payment plan data or preference metadata based on the purchase order now as historical data. Furthermore, the server 102 can be programmed or configured to send the generated purchase order or a notification thereof to an appropriate supplier computer 126 or the buyer computer 122. In response to the purchase order, the supplier computer 126 can be programmed to transmit to the server 102 an approval, a rejection, or a set of necessary changes to the purchase order based on inventory data or other considerations. The supplier computer 126 or the buyer computer 122 can be programmed or configured to also transmit to the server 102 updated payment plan data or a request to update these payment plan data based on the purchase order.

Invoice Processing

In some embodiments, in response to an updated payment plan data, the server 102 is programmed or configured with data structures and/or database records that are arranged to transmit the updated payment plan data or a notification thereof to appropriate devices. In response to a request to update the payment plan data, the server 102 is programmed or configured to determine whether these payment plan data are subject to change or negotiation based on the appropriate buyer or supplier profile and proceed accordingly. Furthermore, in response to an approval of the purchase order or a set of necessary changes, the server 102 is further programmed to generate an invoice, typically showing information identifying the same product or service, an available quantity as appropriate, and an estimated price. The server 102 can also be programmed to receive an invoice corresponding to the purchase order. The server 102 can also be programmed to determine whether any payment plan data is applicable and whether the generation of an invoice is associated with an opportunity to present the payment plan data. In response to a positive answer, the server 102 is programmed or configured to incorporate relevant information from the payment plan data into the invoice or make such relevant information available along with the invoice. The relevant information could have been presented as discussed above in connection with a purchase requisition or a purchase order. In certain embodiments, when the payment plan data was presented or incorporated into a type of document that has led to the invoice, such as a corresponding purchase requisition or purchase order, the payment plan data is automatically presented or incorporated into the invoice by default. The server 102 can also be programmed to review the response from the supplier computer 126 against the payment plan data and send appropriate notifications or recommendations to the supplier computer 126.

In some embodiments, the server 102 is programmed or configured with data structures and/or database records that are arranged to automatically update payment plan data based on the invoice now as historical data. The server 102 is programmed or configured to send the generated invoice or a notification thereof to the buyer computer 122 or to the supplier computer 126. Subsequently, the server 102 can send payment reminders to the buyer computer 122 and/or supplier computer 126 in accordance with the buyer or seller profile. For example, a reminder can be sent each month before the final due date, indicating the final due date and the applicable reward for immediate payoff, or each week after the final due date, indicating the final due date and the applicable penalty for immediate payoff. In response to the invoice, the buyer computer 122 is programmed or configured to transmit to the server 102 an approval, a rejection, a payment, a message confirming payment, an updated purchase requisition, or an updated purchase order based on various factors. Examples include a determination from reviewing the applicable payment plan data and effects of enforcing such payment plan data. The buyer computer 122 or supplier computer 126 can also be programmed to transmit to the server 102 updated payment plan data or a request to update these payment plan data based on the invoice.

Payment Processing

In some embodiments, in response to updated payment plan data or a request to update the payment plan data, the server 102 is programmed or configured with data structures and/or database records that are arranged to proceed as discussed above. Furthermore, in response to an updated purchase requisition or an updated purchase order, the server 102 is programmed or configured to proceed as discussed above in connection with a purchase or a purchase order. In response to a payment or payment confirmation message, the server 102 is again programmed or configured to determine whether any payment plan data is applicable. In response to a positive answer, the server 102 is programmed to perform payment validation based on the applicable payment plan data. For example, the server 102 can be programmed to extract the payment amount from the payment confirmation message as necessary and verify the payment amount given the payment date or the payment method. In response to a successful validation, the server 102 can generate a payment receipt, typically showing information identifying the same product or service, a quantity to be delivered as appropriate, and an actual price, or a payment acknowledgment message typically showing essentially the same information as a payment receipt. The payment receipt or the payment acknowledgment message can also contain an indication of the successful validation. When the validation is unsuccessful, the server 102 can be programmed to send a notification of the unsuccessful validation to the buyer computer 122 or the supplier computer 126. The server 102 is further programmed or configured to determine whether the generation of a payment receipt or payment acknowledgment message is associated with an opportunity to present the payment plan data. In response to a positive answer, the server 102 is programmed to incorporate relevant information from the payment plan data into the payment receipt or payment acknowledgment message or make such relevant information available along with the payment receipt or payment acknowledgment message. The relevant information could have been presented as discussed above in connection with a purchase requisition, a purchase order, or an invoice.

In some embodiments, the server 102 is programmed or configured with data structures and/or database records that are arranged to automatically update payment plan data based on the payment receipt now as historical data. The server 102 is programmed or configured to send the payment or a notification thereof to the supplier computer 126.

Furthermore, the server 102 is programmed to send the generated payment receipt, a notification thereof, or a payment acknowledgement message to the supplier computer 126 or buyer computer 122. In response to the payment receipt, the buyer computer 122 or supplier computer 126 can transmit to the server 102 updated payment plan data or a request to update these payment plan data based on the payment receipt or payment acknowledgment message. In some embodiments, in response to the updated payment plan data or a request to update the payment plan data, the server 102 is programmed to proceed as discussed above.

General Analysis and Management

In some embodiments, the server 102 is programmed or configured with data structures and/or database records that are arranged to analyze historical data using various machine learning techniques, such as linear regression, decision trees, or neural networks, and send various recommendations to buyer computers 122 or the supplier computers 126. By evaluating which buyer computers 122 submit requests for purchase approval or orders, what types of orders are placed, how orders are placed, how supplier computers 126 respond to orders, how payments are made, and so on, the server 102 is further programmed or configured to identify various approaches to improve payment plan data or payment schedules to help increase revenue or reduce costs. For example, the server 102 can be configured to send a prompt to a supplier computer 126 to offer larger discounts or longer payoff periods in low seasons, or a prompt to a buyer computer 122 to submit payments early for unusually large discounts. By evaluating how payment plan data are presented and accessed, the server 102 is programmed to identify additional approaches to improve payment plan data or payment schedules. For example, the server 102 can be configured to determine that repetitive presentation of payment plan data throughout a transaction tends to lead to an earlier payment date, or that a delayed presentation of payment plan data during a transaction tends to reduce time to order placement.

In some embodiments, the server 102 is programmed or configured with data structures and/or database records that are arranged to deliver additional notifications or reminders based on supplier profiles and buyer profiles. The server 102 is also programmed or configured to respond to requests for various reports related to various aspects of ecommerce transactions, including those aspects related to the presentation and access of payment plan data. In addition, the server 102, a buyer computer 122, or a supplier computer 126 can be programmed or configured to perform one or more of the activities discussed above at arbitrary times not tied to generation of specific data or documents. Furthermore, the server 102 can be programmed to create a log for each activity performed, recording information identifying the activity, the performer of the activity, or the time of performance.

Example Server Process

Figure 7:
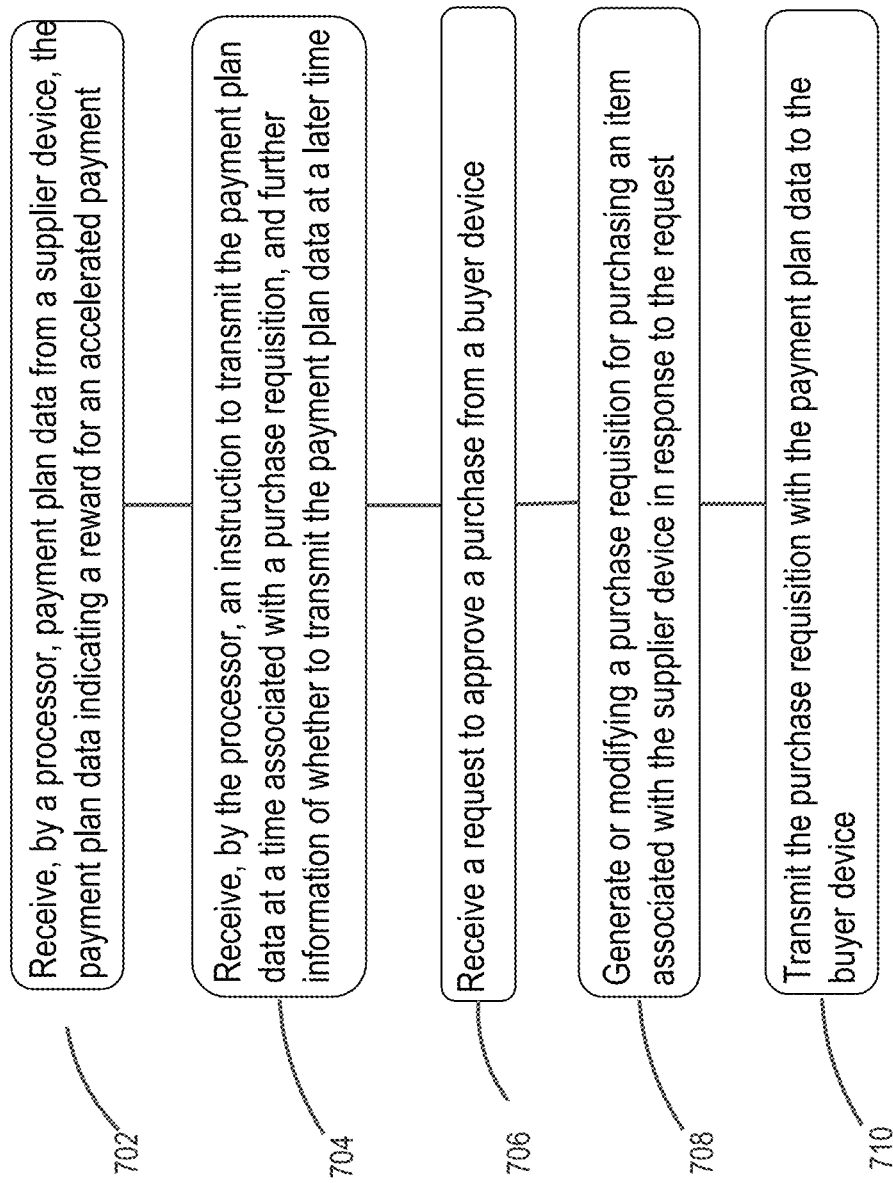
FIG. 7 illustrates an example process of communicating payment plan data according to a specific schedule.

FIG. 7 illustrates an example process of communicating payment plan data according to a specific schedule.

In some embodiments, in step 702, the server 102 is programmed or configured to receive, from a supplier device, payment plan data indicating a reward for an accelerated payment. The reward is digital data for a stored value that can be applied to an account if accelerated payment is received. For example, the payment plan data can indicate the reward in terms of a net D, corresponding to a percentage discount that is applied in exchange for a payment made within a certain number of days after goods are dispatched or service is performed. The payment plan data can indicate a specific number of rewards or a formula that relates an accelerated payment date to a discount amount. Each payment plan data, reward, payment and discount are processed as digital data values in memory using a computing device as further described.

In some embodiments, in step 704, the server 102 is programmed or configured to receive an instruction to transmit the payment plan data at a time associated with a purchase requisition, and further information of whether to transmit the payment plan data at a later time. The instruction can specify making the payment plan data available to a buyer device as early as when a purchase requisition for a product or service related to the supplier system is available. The further information can specify continuously communicating the payment plan data to the buyer device as additional types of transaction data related to the supplier system becomes available, such as a purchase order, an invoice, a payment receipt, a payment confirmation message, or a payment acknowledgement message.

In some embodiments, in step 706, the server 102 is programmed or configured to receive a request to approve a purchase from a buyer device. In step 708, the server 102 is programmed or configured to generate or modify a purchase requisition for purchasing an item associated with the supplier device in response to the request.

In some embodiments, in step 710, the server 102 is programmed or configured to transmit the purchase requisition with the payment plan data to the buyer device. The purchase requisition reflecting the content of the request can be combined with the payment plan data into a single document. The payment plan data can also be presented separately from the purchase requisition.

In some embodiments, the server 102 may be programmed or configured to receive additional requests from the buyer system and generate or modify additional transactional data in response to the additional requests. When the further information indicates transmitting the payment plan data at a later time, the server 102 is programmed to then transmit the transactional data with the payment plan data to the buyer device.

The use of these techniques provides the technical benefit of more efficient computer-implemented transaction processing. As an example, the techniques disclosed herein result in causing open transactions to be closed faster because payment is received sooner. Therefore, database tables and/or data records for open transactions can be moved to slower, archival data storage systems rather than retaining the tables or records in faster non-archival data storage devices that are used for active transactions. The techniques described herein also improve the accuracy of digital data handled by multiple computer systems across the network, because a reward such as a discount can be automatically presented or incorporated into different types of procurement documents, including the ones not controlled by a supplier computer (e.g., a purchase order), and carried through an entire procurement workflow, without requiring a supplier computer to manually insert or otherwise manage accelerated payment terms. Furthermore, the techniques described herein will achieve a reduction in the consumption of network bandwidth and network message or packet traffic, because a reward such as a discount can be offered automatically, accepted, applied and used, all with integration into the requisition or the rest of the procurement process, without requiring a buyer computer system to communicate via multiple roundtrip messages to a supplier computer to negotiate early payment terms, discounts or other rewards, as is typical in conventional systems prior to this disclosure.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
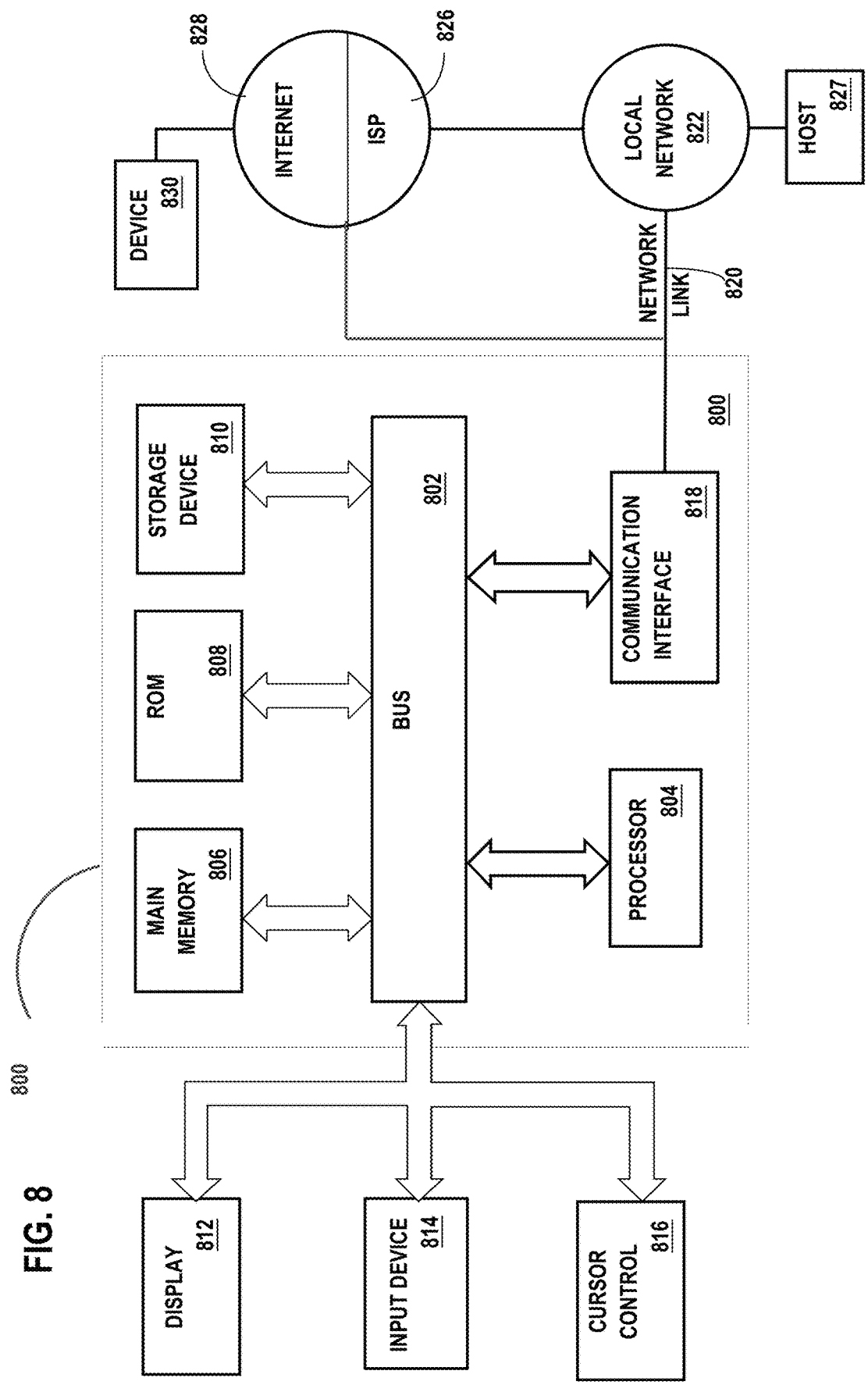
FIG. 8 illustrates a computer system upon which an embodiment of the invention may be implemented.

For example, FIG. 8 illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read-only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server computer 830 might transmit a requested code for an application program through Internet 828, ISP 826, local network 822 and communication interface 818.

The received code may be executed by processor 804 as it is received, and/or stored in storage device 810, or other non-volatile storage for later execution.

OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A computer-implemented method of communicating payment plan data according to a specific schedule, comprising:

receiving, by a processor of a server computer, payment plan data and preference metadata from a supplier device, the payment plan data indicating a reward for an accelerated payment and the preference metadata indicating timing, applicability, and notification of presenting the payment plan data;

receiving, by the processor of the server computer, an instruction to transmit payment plan data at a time associated with a purchase requisition;

storing, by the processor of the server computer, the payment plan data and preference metadata from the supplier device;

receiving, by the processor of the server computer, payment plan data and preference metadata from the buyer device;

storing, by the processor of the server computer, the payment plan data and preference metadata from the buyer device;

receiving a request to approve a purchase from a buyer device;

generating, by the processor of the server computer, a purchase requisition, including a reconciled reward created from data comprising the payment plan data from the buyer device and the payment plan data from the supplier device, for purchasing an item associated with the supplier device in response to the request, without requiring the supplier device to manually insert or manage the accelerated payment terms and without requiring the buyer device to negotiate early payment terms;

transmitting the purchase requisition with the reconciled reward to the buyer device:

causing display by the buyer device of a graphical user interface having an option to continuously adjust a tentative payment date;

receiving one or more tentative payment dates from the buyer device;

causing, as the one or more tentative payment dates are received, display of the graphical user interface showing one or more corresponding payment amounts or discount amounts for the purchase requisition based on the reconciled reward;

receiving from the buyer device a payment confirmation message:

extracting a payment amount from the payment confirmation message:

verifying the payment amount against the reconciled reward;

generating a payment acknowledgement message based on the verifying:

transmitting the payment acknowledgement message to the supplier device.

2. The computer-implemented method of claim 1, the generating comprising combining the reconciled reward with the purchase requisition as one document.

3. The computer-implemented method of claim 1, the payment plan data of the supplier device indicating the reward for an accelerated payment in terms of a net D, corresponding to a percentage discount for a payment made within a certain number of days after goods are dispatched or service is performed.

4. The computer-implemented method of claim 1, the payment plan data of the supplier device indicating a penalty in terms of an annual percentage rate (APR), describing a percentage interest for a payment made beyond a certain number of days after goods are dispatched or service is performed.

5. The computer-implemented method of claim 1, receiving the payment plan data from the supplier device, including receiving a payment deadline and a formula that relates an accelerated payment date to a discount amount.

6. The computer-implemented method of claim 1, receiving the payment plan data from the supplier device, including receiving different portions of the payment plan data for different buyers, suppliers, products, industries, geographies, time periods, unit prices, or order quantities.

7. The computer-implemented method of claim 1, further comprising:
   determining how transmitting one or more purchase requisitions with the payment plan data to the buyer device affects an amount of time to payment or an associated amount of discount;
   sending a result of the determining to the supplier device.

8. The computer-implemented method of claim 1, further comprising sending to the buyer device a reminder of an upcoming payment due date based on the reconciled reward.

9. The computer-implemented method of claim 1, further comprising:
   causing a display by the supplier device of a predetermined list of payment terms, the payment plan data from the supplier device being received responsive to the display;
   receiving information regarding an individual associated with the supplier device as a source of the payment plan data from the supplier device;
   storing the information regarding the individual in association with the payment plan data from the supplier device.

10. The computer-implemented method of claim 1, the timing being associated with one of a plurality of data types, including a purchase order, an invoice, a payment receipt, a payment confirmation message, or a payment acknowledgement message.

11. The computer-implemented method of claim 10, further comprising:
   preparing a recommendation for creating or updating either or both of the payment plan data and the preference metadata of the supplier device based on generating or modifying data of one or more of the plurality of data types;
   sending the recommendation to the supplier device.

12. The computer-implemented method of claim 10, further comprising, when the further information indicates transmitting the payment plan data at a later time, and upon generating or modifying data of one of the plurality of data types, transmitting the data with the reconciled reward to the buyer device.

13. The computer-implemented method of claim 12, further comprising receiving an acceptance or a rejection of the data from the buyer device.

14. The computer-implemented method of claim 10, further comprising:
   receiving a request to update the reconciled reward from the buyer device;
   transmitting the request to the supplier device;
   receiving an updated terms reconciled reward from the supplier device in response to the request;
   transmitting the purchase requisition with the updated reconciled reward to the buyer device.

15. The computer-implemented method of claim 1, the payment acknowledgement message indicating the payment amount and a result of the verifying.

16. The computer-implemented method of claim 1, further comprising:
   gathering, by the processor of the server computer, historical transaction data;
   storing, by the processor of the server computer, the historical transaction data;
   generating, by the processor of the server computer, new preference metadata for the supplier device based on data comprising the historical transaction data and the preference metadata of the supplier device;
   automatically updating, by the processor of the server computer, the preference metadata of the supplier device to be the new preference metadata for the supplier device.

17. A computer-implemented method of communicating payment plan data according to a specific schedule, comprising,
   receiving, by a processor of a server computer, payment plan data and preference metadata from both a supplier device and a buyer device;
   storing, by the processor of a server computer, the payment plan data and the preference metadata from both the supplier device and the buyer device;
   receiving a request to approve a purchase from a buyer device;
   causing, by the processor of the server computer, display by the supplier device of a plurality of accelerated payment terms, each indicating a payment deadline, an accelerated payment date, and a discount amount;
   causing, by the processor of the server computer, further display of a plurality of data types, including a purchase requisition, a purchase order, an invoice, a payment receipt, a payment confirmation message, or a payment acknowledgement message;
   receiving a selection of one of the plurality of accelerated payment terms;
   receiving a selection of one of the plurality of data types;
   transmitting the one accelerated payment terms with specific data related to the supplier device and having the one data type to the buyer device;
   generating, by the processor of the server computer, a recommendation to change the quantity of the purchase for the buyer device to qualify for a discount, wherein the recommendation is created from data comprising the payment plan data and the preference data of both the supplier device and the buyer device;
   transmitting the recommendation to the buyer device of the changes that can be made to the purchase to qualify for the discount:
   causing display by the buyer device of a graphical user interface having an option to continuously adjust a tentative payment date;
   receiving one or more tentative payment dates from the buyer device;
   causing, as the one or more tentative payment dates are received, display of the graphical user interface showing one or more corresponding payment amounts or discount amounts for the purchase requisition based on the reconciled reward;
   receiving from the buyer device a payment confirmation message:
   extracting a payment amount from the payment confirmation message:
   verifying the payment amount against the reconciled reward;
   generating a payment acknowledgement message based on the verifying:
   transmitting the payment acknowledgement message to the supplier device.

18. The computer-implemented method of claim 16, the plurality of data types further including an invoice corresponding to a purchase order, an invoice generated directly without a purchase order, an invoice generated by the processor, or an invoice generated by a third-party computer system.

19. A computer-implemented method of communicating payment plan data according to a specific schedule, comprising:

receiving, by a processor of a server computer, payment plan data and preference metadata from a supplier device, the payment plan data indicating a reward for an accelerated payment and the preference metadata indicating timing, applicability, and notification of presenting the payment plan data;

receiving, by the processor of the server computer, an instruction to transmit payment plan data at a time associated with a purchase requisition;

storing, by the processor of the server computer, the payment plan data and preference metadata from the supplier device;

receiving, by the processor of the server computer, payment plan data and preference metadata from the buyer device;

storing, by the processor of the server computer, the payment plan data and preference metadata from the buyer device;

receiving a request to approve a purchase from a buyer device;

generating, by the processor of the server computer, a purchase requisition, including a reconciled reward created from data comprising the payment plan data from the buyer device and the payment plan data from the supplier device, for purchasing an item associated with the supplier device in response to the request without requiring the supplier device to manually insert or manage the accelerated payment terms and without requiring the buyer device to negotiate early payment terms;

causing display by the buyer device of a graphical user interface having an option to continuously adjust a tentative payment date;

receiving one or more tentative payment dates from the buyer device;

causing, as the one or more tentative payment dates are received, display of the graphical user interface showing one or more corresponding payment amounts or discount amounts for the purchase requisition based on the reconciled reward:

receiving from the buyer device a payment confirmation message:

extracting a payment amount from the payment confirmation message:

verifying the payment amount against the reconciled reward;

generating a payment acknowledgement message based on the verifying:

transmitting the payment acknowledgment message to the supplier device.

\* \* \* \* \*